(12) United States Patent
Caretta

(10) Patent No.: US 6,941,992 B2
(45) Date of Patent: Sep. 13, 2005

(54) TIRE FOR A VEHICLE WHEEL AND METHOD OF MANUFACTURING THE TIRE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 273 days.

(21) Appl. No.: 09/842,662

(22) Filed: Apr. 27, 2001

(65) Prior Publication Data

US 2002/0124935 A1 Sep. 12, 2002

Related U.S. Application Data

(63) Continuation of application No. PCT/EP99/07963, filed on Oct. 20, 1999.
(60) Provisional application No. 60/114,157, filed on Dec. 29, 1998.

(30) Foreign Application Priority Data

Oct. 30, 1998 (EP) .............................................. 98830661

(51) Int. Cl.[7] .......................... B60C 15/00; B60C 15/05; B29D 30/18
(52) U.S. Cl. ....................... 152/540; 152/541; 152/545; 152/546; 152/551; 152/554; 156/117; 156/126; 156/130.7; 156/132; 156/135
(58) Field of Search ................................. 152/540, 543, 152/545, 548, 552, 555, 541, 551, 546, 554; 156/117, 133, 126, 132, 135, 130.7

(56) References Cited

U.S. PATENT DOCUMENTS

| | | | |
|---|---|---|---|
| 3,044,523 A | | 7/1962 | Drakeford et al. |
| 3,240,250 A | * | 3/1966 | Frazier .......................... 152/560 |
| 3,826,297 A | * | 7/1974 | Alderfer ....................... 152/542 |
| 4,248,287 A | | 2/1981 | Christman |

(Continued)

FOREIGN PATENT DOCUMENTS

| | | |
|---|---|---|
| CH | 261 443 | 8/1949 |
| EP | 0 053 997 | 6/1982 |
| EP | 0 467 277 A1 | 1/1992 |
| EP | 0 664 231 A1 | 7/1995 |
| EP | 0 778 161 A1 | 6/1997 |
| EP | 0 780 221 A2 | 6/1997 |
| FR | 1.317.045 | 4/1963 |
| FR | 2.055.988 | 5/1971 |
| FR | 2 678 544 | 1/1993 |

OTHER PUBLICATIONS

K. Tomohiko, "Pneumatic Tire", Patent Abstracts of Japan, JP No. 58–105806, Jun. 23, 1983, (1 Pg.).
R. Caretta et al., "A Tire For Vehicle Wheels", U.S. Appl. No.: 09/198,242, filed Nov. 24, 1998.
R. Caretta et al., "A Method For Making Tires For Vehicle Wheels", U.S. Appl. No.: 09/219,422, filed Dec. 23, 1998.
U.S. Appl. No. 09/364,099, filed Jul. 30, 1999, Caretta.

*Primary Examiner*—Geoffrey L. Knable
(74) *Attorney, Agent, or Firm*—Finnegan, Henderson, Farabow, Garrett & Dunner, L.L.P.

(57) ABSTRACT

A carcass structure for a vehicle wheel tyre includes at least one carcass ply comprising thread elements substantially disposed transversely of a circumferential extension of the carcass structure, and at least one pair of annular reinforcing structures disposed close to respective inner circumferential edges of the at least one carcass ply. Each of the annular reinforcing structures includes at least one first circumferentially-inextensible annular insert formed of at least one first elongated element extending in concentric coils, and at least one second circumferentially-inextensible annular insert formed of at least one second elongated element extending in concentric coils. The at least one carcass ply has end flaps each turned back around an inner circumferential edge of a respective first annular insert and each axially interposed between respective first and second annular inserts. A method of manufacturing the carcass structure is also disclosed.

28 Claims, 7 Drawing Sheets

U.S. PATENT DOCUMENTS

| | | |
|---|---|---|
| 5,362,343 A | 11/1994 | Debroche |
| 6,318,432 B1 | 11/2001 | Caretta et al. |
| 6,328,084 B1 | 12/2001 | Caretta et al. |
| 6,457,504 B1 | 10/2002 | Caretta |
| 2001/0023737 A1 | 9/2001 | Caretta et al. |
| 2001/0042587 A1 | 11/2001 | Caretta et al. |
| 2002/0011297 A1 | 1/2002 | Caretta et al. |
| 2002/0029841 A1 | 3/2002 | Caretta et al. |
| 2002/0056498 A1 | 5/2002 | Caretta et al. |
| 2002/0189737 A1 | 12/2002 | Caretta |

* cited by examiner

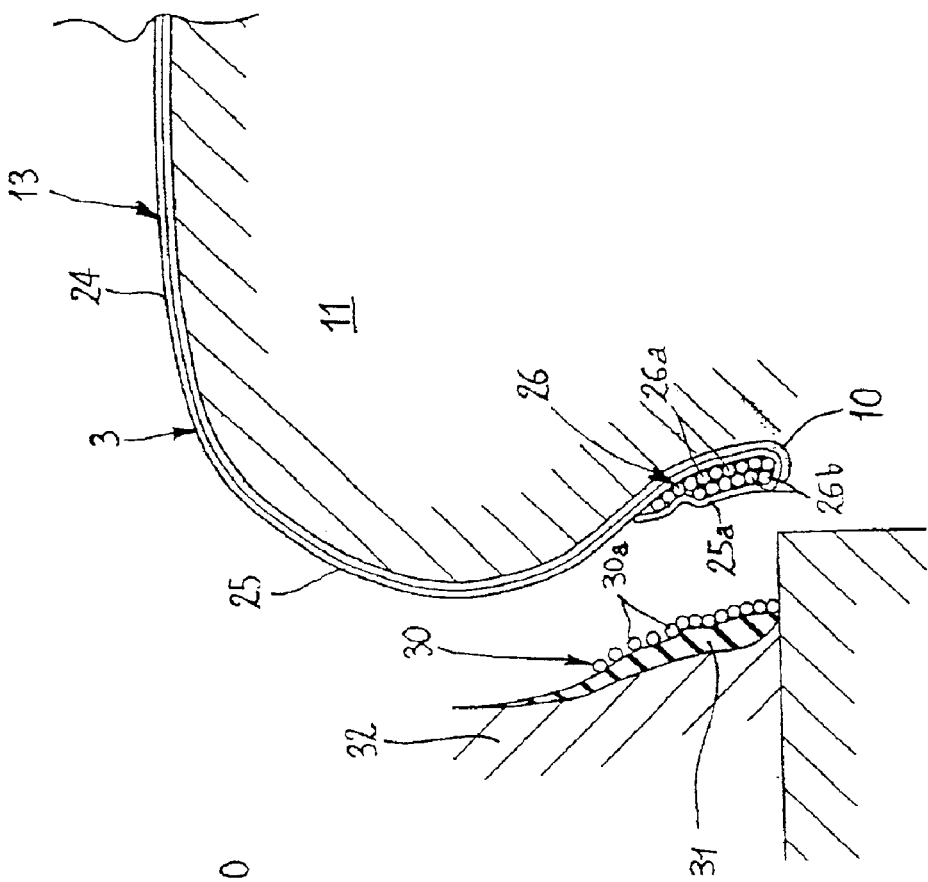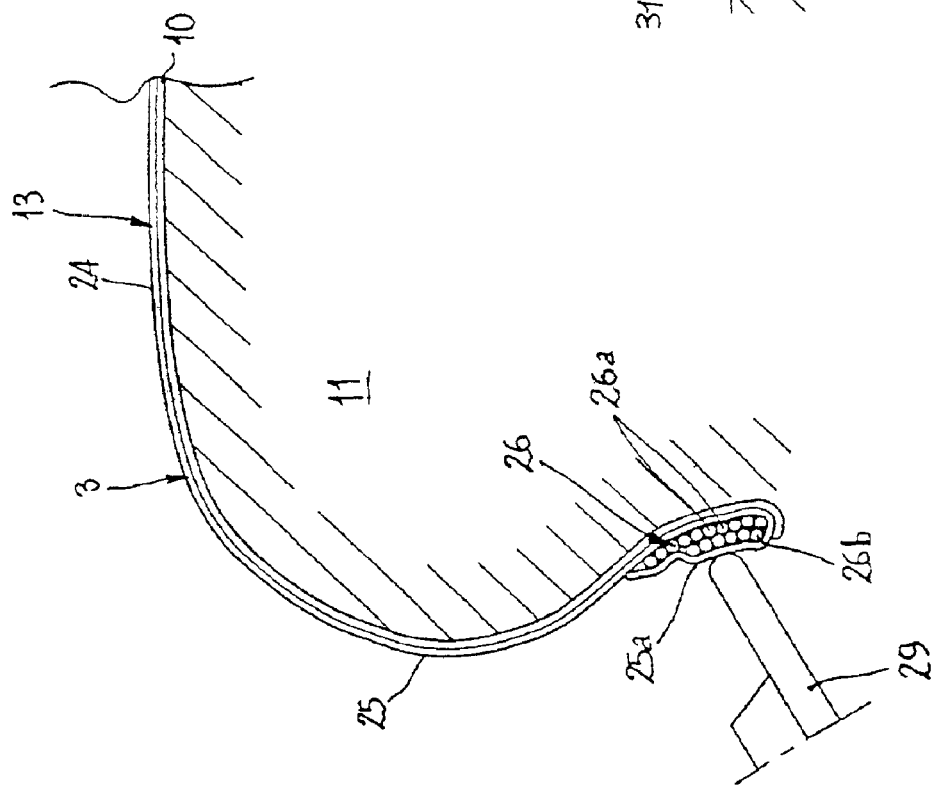

TIRE FOR A VEHICLE WHEEL AND METHOD OF MANUFACTURING THE TIRE

CROSS-REFERENCES TO RELATED APPLICATIONS

This application is a continuation of International Patent Application No. PCT/EP99/07963, filed Oct. 20, 1999, in the European Patent Office; additionally, Applicants claim the right of priority under 35 U.S.C. § 119(a)–(d) based on patent application No. 98830661.9, filed Oct. 30, 1998, in the European Patent Office; further, Applicants claim the benefit under 35 U.S.C. § 119(e) based on prior-filed, copending provisional application No. 60/114,157, filed Dec. 29, 1998, in the U.S. Patent and Trademark Office; the contents of all of which are relied upon and incorporated herein by reference.

BACKGROUND OF THE INVENTION

1. Field of the Invention

The present invention relates to a carcass structure for vehicle wheel tyres of the type comprising at least one carcass ply comprising thread-like elements substantially disposed transversely of a circumferential extension of the tyre; at least one pair of annular reinforcing structures disposed close to respective inner circumferential edges, each of said annular reinforcing structures of the carcass structure comprising: at least one first circumferentially-inextensible annular insert substantially in the form of a crown disposed substantially coaxially of the tyre and close to an inner circumferential edge of the carcass ply, said first annular insert being formed of at least one elongated element extending in concentric coils; at least one second circumferentially-inextensible annular insert substantially in the form of a crown disposed coaxially of the tyre, said second annular insert being formed of at least one elongated element extending in concentric coils.

The invention also relates to a method of manufacturing said carcass structure, said method being of the type comprising the steps of: making a carcass ply having a pair of inner circumferential end flaps; applying at least one annular reinforcing structure close to each end flap of the carcass ply.

2. Description of the Related Art

Manufacturing of tyres for vehicle wheels involves formation of a carcass structure essentially consisting of one or more carcass plies substantially having a toroidal conformation and the axially opposite side edges of which being turned back around respective annular reinforcing structures, each of which usually comprises a circumferentially-inextensible metallic annular insert, commonly referred to as "bead core" and a filling of elastomer material coupled with the bead core at a radially outer position.

Applied to the carcass structure, at a circumferentially external position thereof, is a belt structure comprising one ore more belt strips in the form of a closed ring, essentially consisting of textile or metal cords suitably oriented relative to each other and to the cords belonging to the adjacent carcass plies.

A tread band currently consisting of a strip of elastomer material of appropriate thickness is applied to the belt structure, at a circumferentially external position thereof.

It is to point out that, to the aims of the present description, by the term "elastomer material" it is intended a rubber blend in its entirety, that is the assembly made up of a base polymer suitably amalgamated with reinforcing fillers and/or additives of other types.

Finally, to the opposite sides of the tyre being manufactured a pair of sidewalls are applied, each of them covering a side portion of the tyre included between a so-called shoulder region, located close to the corresponding side edge of the tread band, and a so-called bead located at the corresponding bead core.

In accordance with traditional production methods, essentially the above listed tyre components are first made separately from each other to be then assembled during a tyre-manufacturing step.

Production methods have been recently proposed which, instead of resorting to the production of semifinished products, make the carcass structure directly during the tyre-manufacturing step.

For example, U.S. Pat. No. 5,362,343 discloses a method and an apparatus forming a carcass ply starting from a single cord previously wound around a reel that at every operating cycle of the apparatus is cut to size for obtaining a section of preestablished length.

The cord section is transversely laid down on the outer surface of a rigid toroidal support previously coated with a layer of raw rubber, then the section ends are radially applied to the respectively opposite sides of the toroidal support itself.

Repetition of the above described operating cycle leads to deposition of a number of cord sections circumferentially disposed in side by side relationship until the whole circumferential extension of the toroidal support has been covered, so as to define a carcass ply.

For the purpose of manufacturing the annular reinforcing structures, it is also known that close to each of the tyre beads, the opposite ends of the individual cords forming a carcass ply are arranged, in an alternating sequence, at axially opposite positions relative to an annular anchoring element made up of coils of metal wire such disposed as to form concentric circumferences arranged substantially in form of a crown, as can be learnt from patent EP 0 664 231.

In the European patent application No. 97830731.2 in the name of the same Applicant, a method and a tyre are described in which each carcass ply is formed by laying down a plurality of strip-like sections following each other onto a rigid toroidal support, each of said sections comprising a plurality of parallel longitudinal cords incorporated into a layer of elastomer material.

When deposition has been completed, each section substantially extends in a U-shaped conformation around the cross-section outline of the toroidal support, so as to exhibit a crown portion extending transversely of the circumferential extension of the toroidal support itself, according to a given angle, and two side portions extending in the direction of the geometric axis of the toroidal support and partly overlapping the side portion of the previously laid-down section.

After the first carcass ply has been manufactured, the annular reinforcing structures are applied at a radially inner position against the end flaps of the ply itself, each of said reinforcing structures comprising a filling insert of elastomer material of a substantially triangular section, interposed between first and second circumferentially-inextensible annular inserts, each formed of a thread-like element wound in concentric coils substantially in the form of a crown.

Then a second carcass ply is formed and disposed upon the first carcass ply and the annular reinforcing structures, said second carcass ply being obtained by strip-like sections laid down in a crossed orientation with respect to those of the first carcass ply.

In the above mentioned patent application it is highlighted that the crossed orientation of the strip-like sections belonging to the first and second carcass plies respectively, as well as the mutually crossed arrangement of the overlapping regions between the sections belonging to the first and second carcass plies respectively, give the bead and sidewall areas of the tyre excellent features in terms of structural resistance in relation to the effects due to slip thrusts and to the twisting moments transmitted in acceleration and braking.

SUMMARY OF THE INVENTION

In accordance with the present invention, it has been found that advantageously optimal qualities of structural resistance can be given to the tyre bead, while keeping a satisfactory lightness in weight and structural flexibility of the carcass structure at the radially outer regions thereof, if, for accomplishment of each annular reinforcing structure, an end flap of the carcass ply is turned back around a first circumferentially-inextensible insert and axially interposed between the first insert itself and a second circumferentially-inextensible insert.

In more detail, the invention relates to a carcass structure in a vehicle wheel tyre, characterized in that said carcass ply has end flaps each turned back around an inner circumferential edge of the respective first annular insert and each axially interposed between the respective first and second annular inserts.

Preferably, the carcass structure further comprises at least one filling body of elastomer material in contact with at least one of said inextensible annular inserts.

In a possible embodiment, the second inextensible annular insert is conveniently interposed between the respective end flap and the filling body, and in contact with the end flap on the opposite side relative to the first inextensible annular insert.

Alternatively, the filling body can be advantageously interposed between the respective end flap of the carcass ply and the respective second annular insert.

In such case, the second annular insert is preferably directly in contact with at least one axially outer side surface of the respective filling body, located on the opposite side relative to the end flap of the carcass ply.

Preferably, the end flap of the carcass ply completely covers the respective first inextensible annular insert.

The second inextensible annular insert can conveniently project beyond one end region of the respective end flap, as well as possibly beyond an outer circumferential edge of the first inextensible annular insert.

Alternatively, the first inextensible annular insert can project beyond one end region of the respective end flap and/or beyond an outer circumferential edge of the respective second inextensible annular insert.

Preferably, the first inextensible annular insert comprises at least one first series of concentric coaxial coils and one second series of concentric coaxial coils disposed in axial side by side relationship with the coils of the first series.

The number of coils of the first series is preferably greater than the number of coils of the second series, and the first coil series is directly in contact with the carcass ply, whereas the second coil series is directly in contact with the respective end flap.

The filling body preferably has a circumferentially outer portion directly in contact with a side surface of the carcass ply.

It is also preferably provided that said at least one carcass ply should comprise: a plurality of strip-like sections each comprising at least two of said thread-like elements disposed longitudinally and parallelly of each other and at least partly covered with at lest one later of raw elastomer material, each of said strip-like sections extending in a substantially U-shaped configuration according to a cross section outline of the carcass structure, to define two side portions substantially extending in planes orthogonal to a geometric axis of the carcass structure itself at mutually spaced apart positions in an axial direction, and a crown portion extending at a radially outer position between the side portions; said crown portions being disposed in side by side relationship with each other along the circumferential extension of the carcass structure, whereas the side portions of each strip-like section are each partly covered with a side portion of at least qn adjoining strip-like section.

Advantageously, the side portions of said strip-like sections mutually converge towards the geometric axis of the carcass structure, the covering of the side portions of the strip-like sections progressively increasing in the direction of the inner circumferential edge of the carcass ply starting from a zero value close to transition regions between said side portions and said crown portions.

The present invention also relates to a method of manufacturing a carcass structure for vehicle wheel tyres, characterized in that each annular reinforcing structure is formed by the following steps: applying at least one first inextensible annular insert close to the respective end flap of the carcass ply, said first inextensible annular insert being formed of at least one first elongated element disposed in concentric coils; turning back the end flap of the carcass ply around an inner circumferential edge of the first annular insert; applying at least one second inextensible annular insert close to the first annular insert, said second inextensible annular insert being formed of at least one second elongated element disposed in concentric coils.

Preferably, also provided is a step of applying at least one filling body of elastomer material in contact with at least one annular insert.

Preferably, at least one of said first and second inextensible annular inserts is formed by winding up a continuous elongated element in radially-superposed concentric coils.

In more detail, at least one of said first and second inextensible annular inserts can be conveniently formed directly against the carcass ply.

Alternatively, at least one of said first and second annular inserts can be formed in a forming die, said forming die being subsequently moved against the carcass ply for application of the inextensible annular insert.

Turning-back of the end flap preferably comprises the following steps: axially pushing the end flap for moving it from a first position in which it projects radially inwardly relative to the first inextensible annular insert to a second position in which it is axially oriented away from an equatorial plane of the carcass structure; exerting a rolling action on the end flap for laterally applying it against the first inextensible annular insert.

In a preferential embodiment, application of the filling body comprises the steps of: making said filling body in a forming die; axially moving the forming die against the carcass structure.

In addition, before the simultaneous application of the filling body and the second inextensible annular insert against the carcass structure, coupling of the filling body with the second inextensible annular insert in the forming die may be advantageous.

Alternatively, application of the filling body may be carried out by forming the filling body directly against the carcass structure.

In more detail, said formation of the filling body against the carcass structure preferably takes place by extrusion of at least one continuous strip-like element wound up in superposed coils.

In accordance with a preferred embodiment of the invention, manufacture of the carcass ply comprises the following steps: preparing strip-like sections each comprising longitudinal and parallel thread-like elements at least partly coated with one layer of raw elastomer material; depositing each of the strip-like sections onto a toroidal support in a substantially U-shaped conformation around the cross section outline of the toroidal support, to define two side portions substantially extending in planes orthogonal to a geometric axis of rotation of the toroidal support at mutually spaced apart positions in an axial direction, and a crown portion extending at a radially outer position between the side portions, in which the crown portions of each strip-like section are consecutively disposed in side by side relationship along the circumferential extension of the toroidal support, whereas the side portions of each strip-like section are each partly covered with a side portion of at least one circumferentially consecutive section.

Advantageously, the side portions belonging to circumferentially contiguous strip-like sections on the toroidal support are caused to mutually converge in the direction of the geometric rotation axis of the toroidal support itself, the covering of the side portions of each strip-like section progressively increasing in the direction of the inner circumferential edge of the carcass ply starting from a zero value close to transition regions between said side portions and said crown portions.

The strip-like sections are conveniently laid down by making the side portions of each strip-like section project from an inner circumferential edge of the toroidal support, the projecting ends of the side portions defining the end flaps of said carcass ply.

BRIEF DESCRIPTION OF THE DRAWINGS

Further features and advantages will be best understood from the detailed description of a preferred but non-exclusive embodiment of a tyre for vehicle wheels according to the present invention. This description will be taken hereinafter with reference to the accompanying drawings, given by way of non-limiting example, in which:

FIG. 11 is a fragmentary diametrical section view of an operating step in which turning back of the end flap of the carcass ply is completed by a rolling action;

FIG. 12 is a fragmentary diametrical section view showing application of a second circumferentially-inextensible annular insert together with a filling insert;

DETAILED DESCRIPTION OF THE PREFERRED EMBODIMENTS

Figure 1:
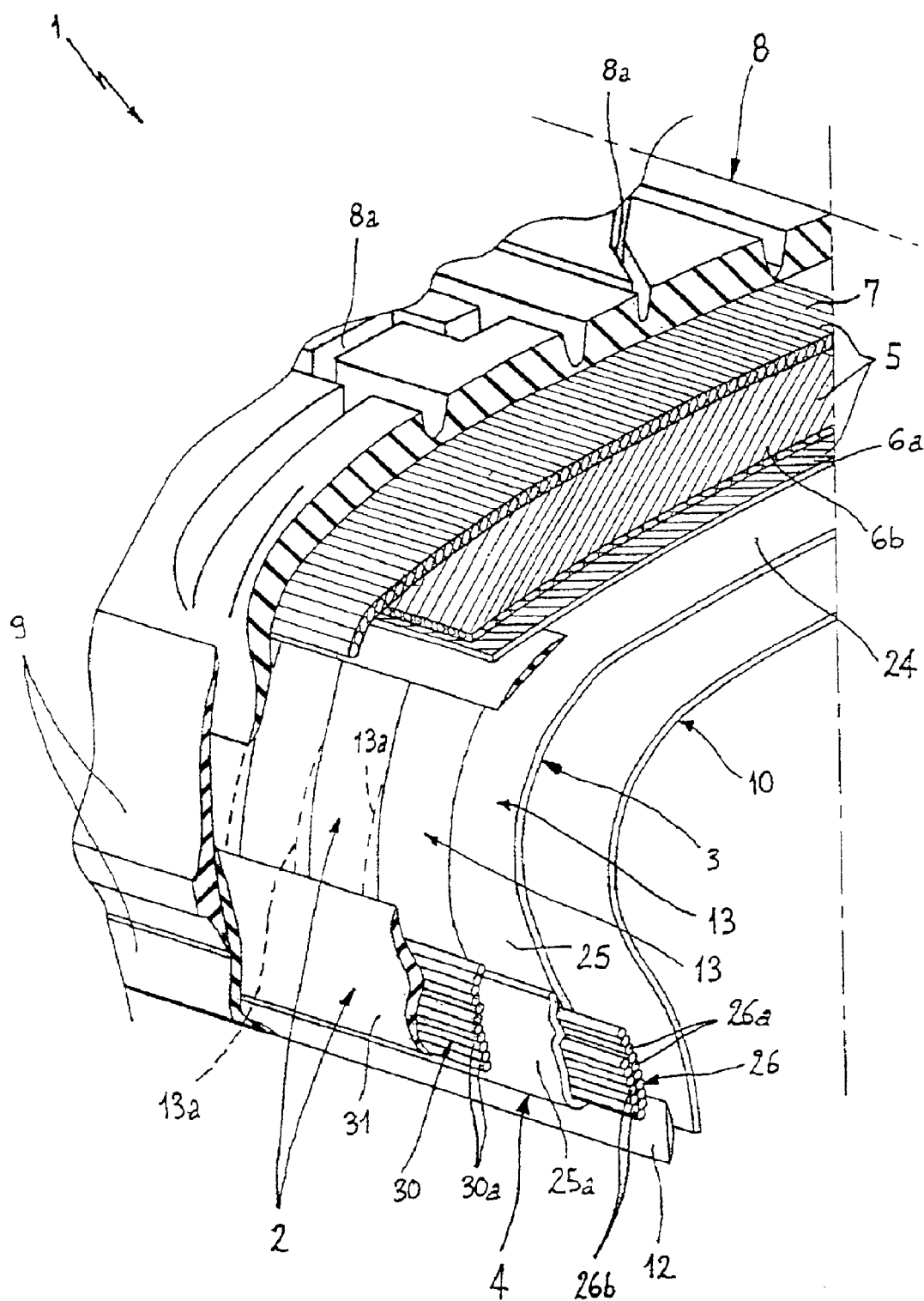
FIG. 1 is a fragmentary split perspective view of a tyre in accordance with the present invention.

With reference to the drawings, a tyre for vehicle wheels having a carcass structure 2 manufactured in accordance with the present invention has been generally identified by reference numeral 1.

The carcass structure 2 has at least one carcass ply 3 having a substantially toroidal conformation and in engagement, by its opposite circumferential edges, with a pair of annular reinforcing structures 4, each of which is located, when the tyre has been completed, at the region usually identified as "tyre bead".

Applied to the carcass structure 2 at a circumferentially outer position thereof, is a belt structure 5 comprising one or more belt strips 6a, 6b and 7. A tread band 8 is circumferentially superposed on the belt structure 5 and longitudinal and transverse cuts 8a are formed in said tread band 8, following a moulding operation carried out concurrently with the tyre vulcanization, and such disposed as to define a desired "tread pattern".

The tyre also comprises a pair of so-called "sidewalls" 9 laterally applied to opposite sides of the carcass structure 2.

The carcass structure 2 may possibly be coated, on its inner walls, with a liner 10, essentially consisting of a layer of air-proof elastomer material, suitable to ensure the hermetic seal of the inflated tyre.

Assembling of the above listed components, as well as production of one or more of said components, takes place with the aid of a toroidal support 11, diagrammatically shown in FIGS. 2 to 5, having the same shape as the inner walls of the tyre to be manufactured.

In a preferential solution the toroidal support 11 has reduced sizes relative to those of the finished tyre, according to a linear amount preferably included between 2% and 5%, measured, just as an indication, along the circumferential extension of the support itself at an equatorial plane X—X thereof which is coincident with the equatorial plane of carcass structure 2 and tyre 1 taken as a whole.

The toroidal support 11, which is not described or illustrated in detail in that it is not particularly of importance to the purposes of the invention, may for example consist of a collapsible drum or a suitably-reinforced inflatable bladder, so that it may take and maintain the desired toroidal conformation under inflation conditions.

After taking into account the above statements, manufacture of tyre 1 first involves formation of the carcass structure 2 which starts with the possible formation of liner 10.

Manufacture of liner 10 can take place in any manner convenient for a person skilled in the art, and therefore it is not described in detail.

It is to be noted that concurrently with manufacture or application of liner 10, application of a pair of auxiliary annular elements 12 can be carried out close to the inner circumferential edges of the carcass structure 4 being manufactured. These auxiliary annular elements 12 can be obtained for example from at least one auxiliary ribbon-like band obtained from a respective extruder located at the toroidal support 11.

In accordance with a preferential embodiment of the present invention, the carcass ply 3 is directly formed on the toroidal support 11 by depositing thereon, as better clarified in the following, a plurality of strip-like sections 13 obtained from at least one continuous strip-like element 3a preferably having a width included between 3 mm and 20 mm.

Figure 6:
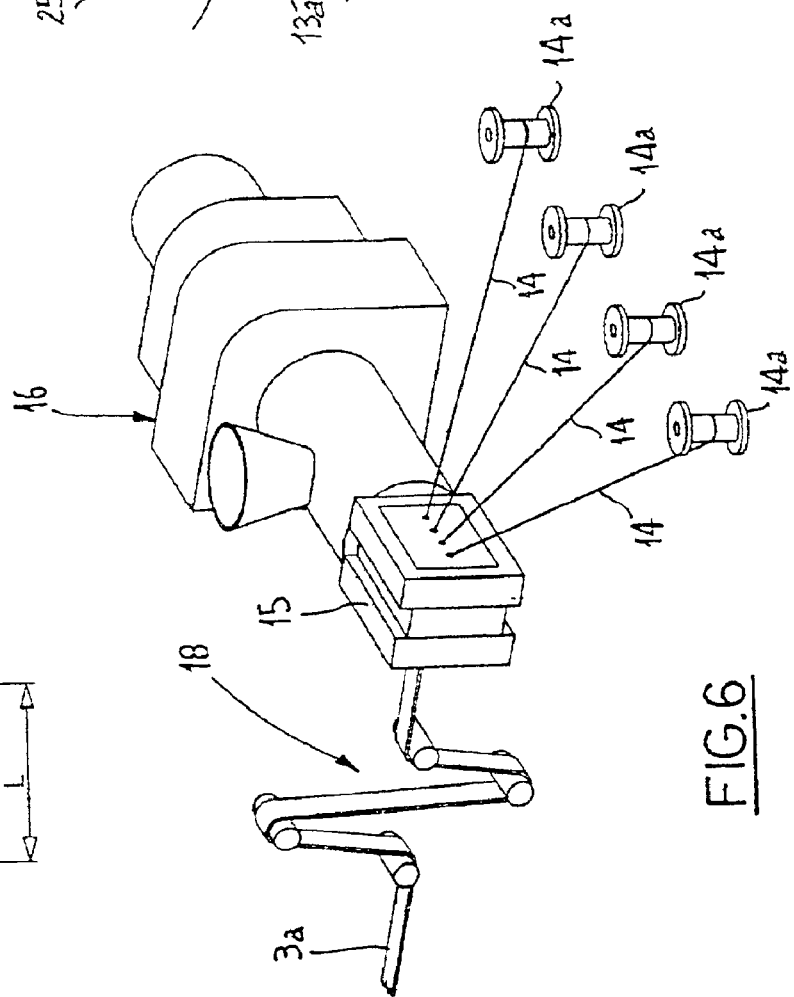
FIG. 6 is a diagram showing manufacture of a continuous strip-like element intended for forming the carcass ply.

As shown in FIG. 6, preparation of the continuous strip-like element 3a essentially involves that two or more thread-like elements 14, and preferably three to ten thread-like elements 14, fed from respective reels 14a, should be guided through a first extruder 15 associated with a first extrusion apparatus 16 carrying out feeding of raw elastomer material through the extruder itself.

It is pointed out that, to the purposes of the present description by "extruder" it is intended that part of the extrusion apparatus, also identified in this particular field by the term "extrusion head", provided with a so-called "die" passed through by the product being worked at an outlet port shaped and sized according to the geometrical and dimensional features to be given to the product itself.

The elastomer material and thread-like elements 14 are intimately joined together within the extruder 15, thereby generating the continuous strip-like element 3a at the outlet thereof, which element is formed of at least one layer of elastomer material 17 in the thickness of which the thread-like elements themselves are partly incorporated.

The thread-like elements 14 may each consist for example of a textile cord preferably having a diameter included between 0.6 mm and 1.2 mm, or a metallic cord preferably having a diameter included between 0.3 mm and 2.1 mm.

In order to give the carcass ply 3 the desired compactness and homogeneity qualities, the thread-like elements 14 can be disposed with a thickness greater than six thread-like elements per centimetre, as circumferentially detected on the carcass ply 3 close to the equatorial plane X—X of the carcass structure 2. In any case, it is preferably provided that the thread-like elements 14 should be disposed in the strip-like element 3a according to a mutual distance between centres not lower than 1.5 times the diameter of the thread-like elements themselves, in order to enable appropriate rubberizing between the adjacent threads.

The continuous strip-like element 3a coming out of the extruder 15 can be advantageously guided, optionally through a first accumulator-compensator device 18, to a deposition apparatus 19 diagrammatically shown in FIGS. 2 to 5.

The deposition apparatus 19 essentially comprises first guide members 20, consisting for example of a pair of opposite rollers intended for engagement of the continuous strip-like element 3a produced by the extruder 15, downstream of the accumulator-compensator device 18.

Downstream of the first guide members 20, the strip-like element 3a comes into engagement with a first grip member 21 movable in a direction oriented transversely of the equatorial plane X—X of the toroidal support 11.

Figure 2:
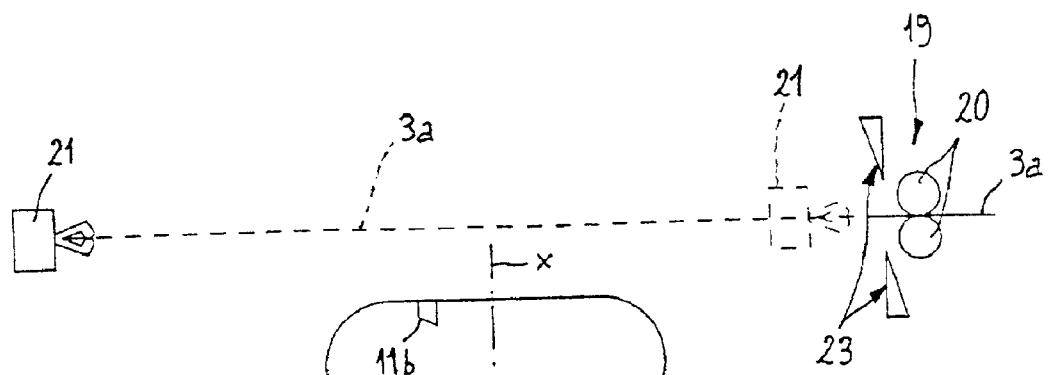
FIGS. 2 to 5 diagrammatically show an apparatus for making the carcass ply, according to different operating steps respectively, seen in a direction orthogonal to a diametrical section plane of a toroidal support carrying the tyre during the manufacturing step.
Figure 3:
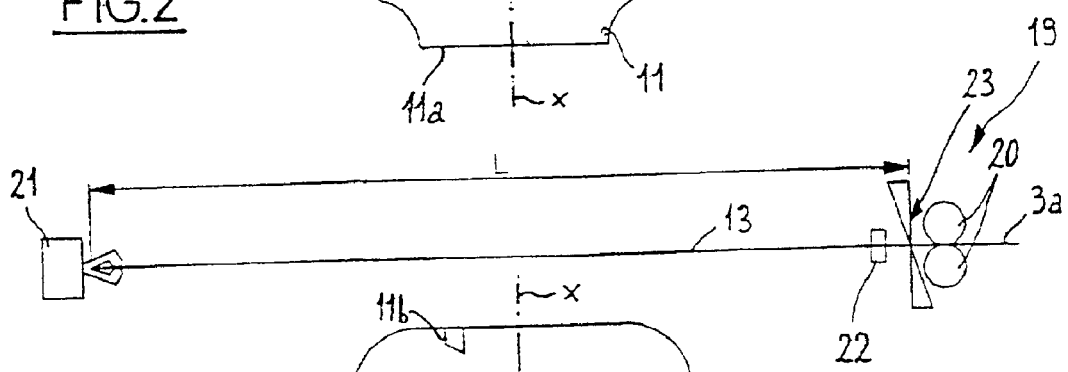

In more detail, the first grip member 21 is movable between a first operating position in which, as shown in FIG. 2, it engages one end of the continuous strip-like element 3a close to the first guide members consisting of opposite rollers 20, and a second operating position in which, as shown in FIG. 3, it is moved apart from the first guide member in order to lay down the continuous strip-like element 3a transversely of the equatorial plane X—X of the toroidal support 11.

When the first grip member 21 has reached the second operating position, a second grip member 22 engages the continuous strip-like element 3a close to the first guide members 20.

Then, intervention of a cutting member 23 takes place and it cuts the continuous strip-like element 3a at a stretch thereof included between the second grip element 22 and the first guide members 20, giving rise to formation of a strip-like section 13 of a predetermined length "L".

Following the cutting action by the cutting member 23, the obtained strip-like section 13 is laid down transversely and at a centred position relative to the equatorial plane X—X of the toroidal support.

Afterwards, the grip members 21 and 22 are simultaneously translated in the direction of the geometric axis of the toroidal support 11 by radially moving the strip-like section 13 close to the toroidal support. Under this circumstance, formation of a crown portion 24 takes place at a centred position on the longitudinal extension of the strip-like section 13, which portion extends at a radially outer position on the toroidal support 11.

Figure 4:
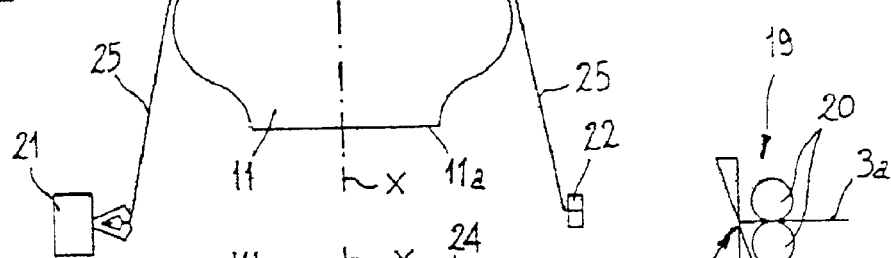

As can be clearly inferred from FIG. 4, as the radial movement of the grip members 21 and 22 goes on, the opposite ends of the strip-like section 13 are moved radially close to the geometric axis of rotation of the toroidal support 11, giving rise to formation of two side portions 25 substantially extending in planes orthogonal to the geometric axis of rotation of the toroidal support, at positions axially spaced apart from each other.

By a possible subsequent approaching movement of the grip members 21 and 22 towards the equatorial plane X—X of the toroidal support 11, the opposite ends of the strip-like section 13 are definitively applied to the toroidal support itself so that deposition of section 13 is completed, this section taking a substantially U-shaped configuration around the cross section outline of the toroidal support itself.

To the purposes of the present description, by cross-section outline it is intended the configuration exhibited by the half-section of the toroidal support 11 sectioned along a plane radial to a geometric rotation axis thereof, not shown in the drawings, which is coincident with the geometric rotation axis of the carcass structure 2 and the tyre being manufactured.

Figure 5:
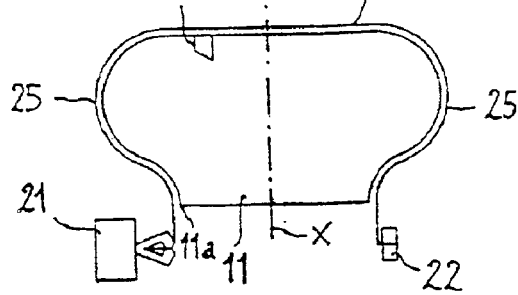

As shown in FIG. 5, it is preferably provided that when deposition has been completed, each of the side portions 25 of each strip-like section 13 should radially project, by its opposite ends, from an inner circumferential edge 11a of the toroidal support 11, so as to define, in the obtained carcass ply 3, end flaps 25a radially projecting towards the geometric axis of the toroidal support, to the purposes better clarified in the following.

If required, the side portions 25 of the strip-like section 13 can be submitted to a pressing step against the side walls of the toroidal support 11. For the purpose, a pair of pressing rollers or equivalent means not shown may be provided for operation on the opposite sides of the toroidal support 11, which rollers are each arranged to act on the respective side portion 25 by a thrust action and simultaneous radial sliding towards the geometric axis of rotation of the toroidal support 11.

Due to the sticky character of the raw elastomer material forming layer 17 coating the thread-like elements 14, a steady adhesion of the strip-like section 13 to the surfaces of the toroidal support 11 is ensured, even in the absence of liner 10 on said toroidal support. In more detail, the above described adhesion takes place as soon as the strip-like section 13 comes into contact with the toroidal support 11 at a radially external region of its cross section outline.

In addition to, or in place of the above described exploitation of the natural sticky character of the elastomer material, holding of one or more strip-like sections 13 on the toroidal support 11 can be obtained by carrying out a suction action produced through one or more appropriate holes 11b arranged on the toroidal support.

The toroidal support 11 can be driven in angular rotation according to a step-by-step movement in synchronism with operation of the deposition apparatus 19, in such a manner that at each cutting action of each strip-like section 13 deposition of the latter onto the toroidal support takes place in a circumferential side by side relationship with the strip-like section 13 previously deposited.

It is to be pointed out to the purposes of the present description that, when not otherwise stated, the term "circumferential" refers to a circumference lying in the equatorial plane X—X and close to the outer surface of the toroidal support 11.

Due to the above described operating sequence of the deposition apparatus 19, in the first carcass ply 3 thus obtained the crown portions 24 of each strip-like section 13 are consecutively disposed in side by side relationship along the circumferential extension of the toroidal support 11, whereas each of the side portions 25 of each section 13 is partly superposed with the side portion 25 of at least one section 13 previously laid down, and also partly covered with the side portion 25 of at least one section 13 laid down subsequently. In the accompanying figures, the overlapping regions of the strip-like sections 13 forming the first carcass ply 3 are identified by 13a.

Figure 8:
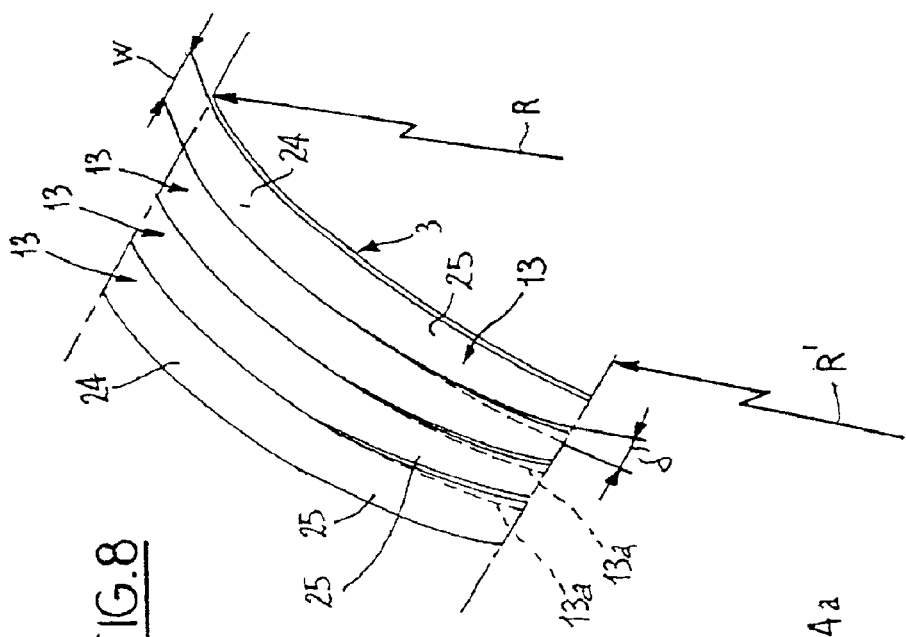
FIG. 8 is a fragmentary perspective view diagrammatically showing the deposition sequence of strip-like sections for the purpose of forming the ply belonging to the carcass structure in accordance with the invention.
Figure 7:
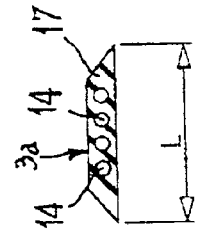
FIG. 7 shows an embodiment of said strip-like element in cross section.

As clearly shown in FIG. 8, the side portions 25 in mutual superposition relationship converge towards each other substantially in the direction of the geometric axis of rotation of the toroidal support 11, at an angle δ the value of which is correlated with the width "W" of the strip-like sections 13, and in any case with the circumferential distribution pitch thereof, as well as with the value of a maximum radius R to be measured at a point of maximum distance from the geometric axis of rotation of the toroidal support 11.

Due to the mutual convergence between the contiguous side portions 25, the mutual superposition or covering of same, i.e. the circumferential width of the overlapping regions 13a, progressively increases in the direction of the respective inner circumferential edge of the carcass structure 2, starting from a zero value at the transition region between the side portions 15 and the crown portions 24.

It is to note that, due to the difference between a maximum radius R and a minimum radius R', to be measured at a point of minimum distance from the geometric axis of rotation of the toroidal support 11, the average thickness of the thread-like elements 14, i.e. the amount of the thread-like elements 14 present in a circumferential section of given length, progressively increases on moving close to said geometric rotation axis.

In fact, this increase in thickness is proportional to the ratio value between the maximum radius R and minimum radius R'.

It is also to note that the thread-like elements 14 belonging to two mutually superposed side portions 25 are disposed in respectively crossed orientations at an angle corresponding to said angle δ, in correlation with the width of the individual sections 13 and their circumferential distribution pitch, as well as with the value of the maximum radius R.

By suitably inclining the orientation of the geometric axis of rotation of the toroidal support 11 relative to the movement direction of the first grip member 21 a desired inclination can be given to the crown portions 24 of sections 13 which is included, by way of example, between 0° and 25° relative to a radial plane passing through the geometrical axis. In more detail, this inclination may be advantageously included between 0° and 15° and more preferably between 0° and 3°, if the carcass structure 2 comprises only one carcass ply 3 as in the example shown, or included between 10° and 20°, and more preferably correspond to 15°, if the carcass structure also comprises a second carcass ply.

Accomplishment of a carcass structure 2 generally comprises the step of applying said annular reinforcing structure 4 to an area close to each of the inner circumferential edges of the carcass ply 3 for the purpose of creating the carcass regions known as "beads", which are specifically intended for ensuring anchoring of the tyre to a corresponding mounting rim; in accordance with a preferred embodiment of the tyre, the carcass ply thereof is obtained in the above described manner.

In accordance with the present invention, accomplishment of each reinforcing structure 4 is carried out by applying at least one first circumferentially-inextensible annular insert 26, substantially in the form of a crown concentric with the geometric axis of rotation of the toroidal support 11, to an area close to each of the end flaps 25a of the carcass ply 3. The first annular insert 26 can be made up of one or more elongated metal elements wound up in several substantially-concentric coils 26a, 26b. Coils 26a, 26b may be defined by a continuous spiral or by concentric loops made up of respective elongated elements.

In more detail, in the preferential embodiment illustrated each first annular insert 26 comprises a first series of concentric coaxial coils 26a and a second series of concentric coaxial coils 26b disposed axially close to the coils 26a of the first series. The number of coils 26a of the first series, located directly in contact with the carcass ply 3, is preferably greater than the number of coils 26b of the second series, located on the opposite side with respect to the carcass ply itself.

Accomplishment of each first annular insert 26 can be advantageously carried out by winding up a continuous elongated element on a forming die 27 the shape of which matches that of the insert. For winding, forming die 27 can be driven in rotation around its own axis, while the elongated element is being suitably guided with the aid of rollers or in any other manner convenient for a person skilled in the art, so as to define coils 26a, 26b disposed according to the first and second series.

Forming die 27, conveniently arranged coaxially with the toroidal support 11 can be subsequently moved in an axial direction against the carcass ply 3 for application of the first annular insert 26, utilizing the toroidal support as a rigid contrast-element in order to exert an appropriate force for applying the insert against the carcass ply.

Alternatively, formation of the first annular insert 26 can be carried out directly against the carcass ply 3 arranged on the toroidal support 11, in the same manner as above described with reference to formation of said insert on forming die 27.

Figure 9:
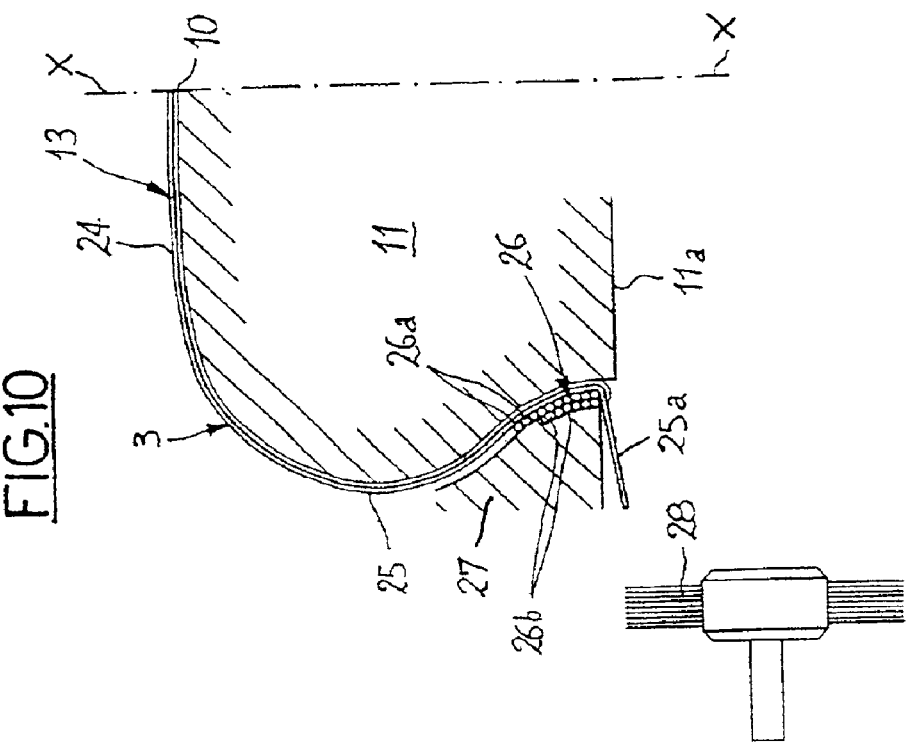
FIG. 9 is a fragmentary diametrical section view of an operating step in which a first annular insert is formed for application to the carcass ply in order to make an annular reinforcing structure at the tyre bead.
Figure 10:
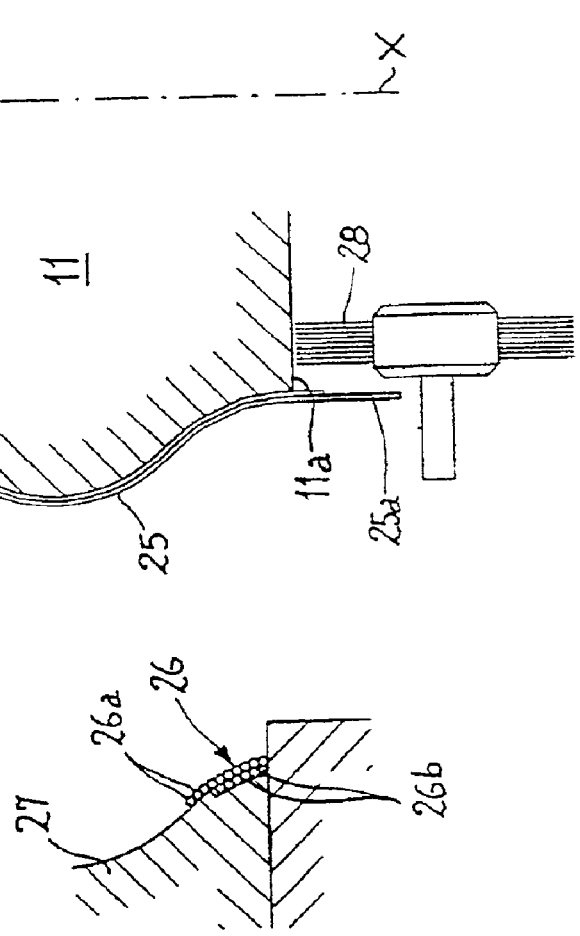
FIG. 10 is a fragmentary diametrical section view of an operating step in which an end flap of the carcass ply is about to be turned back around the first annular insert applied to the ply itself.

As shown in FIGS. 9 and 10, the first annular insert 26 is such applied that its inner circumferential edge is substantially in coincidence with the inner circumferential edge 11a of the toroidal support 11. In other words, on its application the first annular insert 26 is disposed at a radially outer position relative to the corresponding end flap 25a of the carcass ply 3.

When application has been completed, the end flap 25a of the carcass ply 3 is turned -back around the inner circumferential edge of the first annular insert 26.

This turning-back step can be for example carried out with the aid of at least one brush element 28 associated with the toroidal support 11 and movable between a first operating position in which, as shown in FIG. 9, it is located at a radially inner position relative to the toroidal support and a second operating position in which it is axially moved away from the equatorial median plane X—X of the toroidal support 11, as seen in FIG. 10.

Following the above displacement, the brush element 28 exerts an axial thrust on the end flap 25a so as to bring it from a first position in which, as it appears from the preceding description, it projects radially inwardly relative to the first annular insert 26, to a second position in which, as seen in FIG. 10, it is oriented axially away from the equatorial plane X—X.

During this operating step, forming die 27 can be maintained in thrust relationship on the first annular insert 26, to ensure steadiness of same during folding of the end flap 25a from the first to the second position.

Subsequently, after removal of forming die 27, a rolling action is carried out on the end flap 25a, to laterally apply it against the first annular insert 26.

As viewed from FIG. 11, this rolling action can be obtained by at least one roller 29 acting on the end flap 25a in contrast relationship against the first annular insert 26. Roller 29 can be radially moved away from the geometric axis of the toroidal support 11 while said support is driven in rotation, in order to ensure a homogeneous application of the end flap 25a over the whole surface extension thereof.

Figure 14:
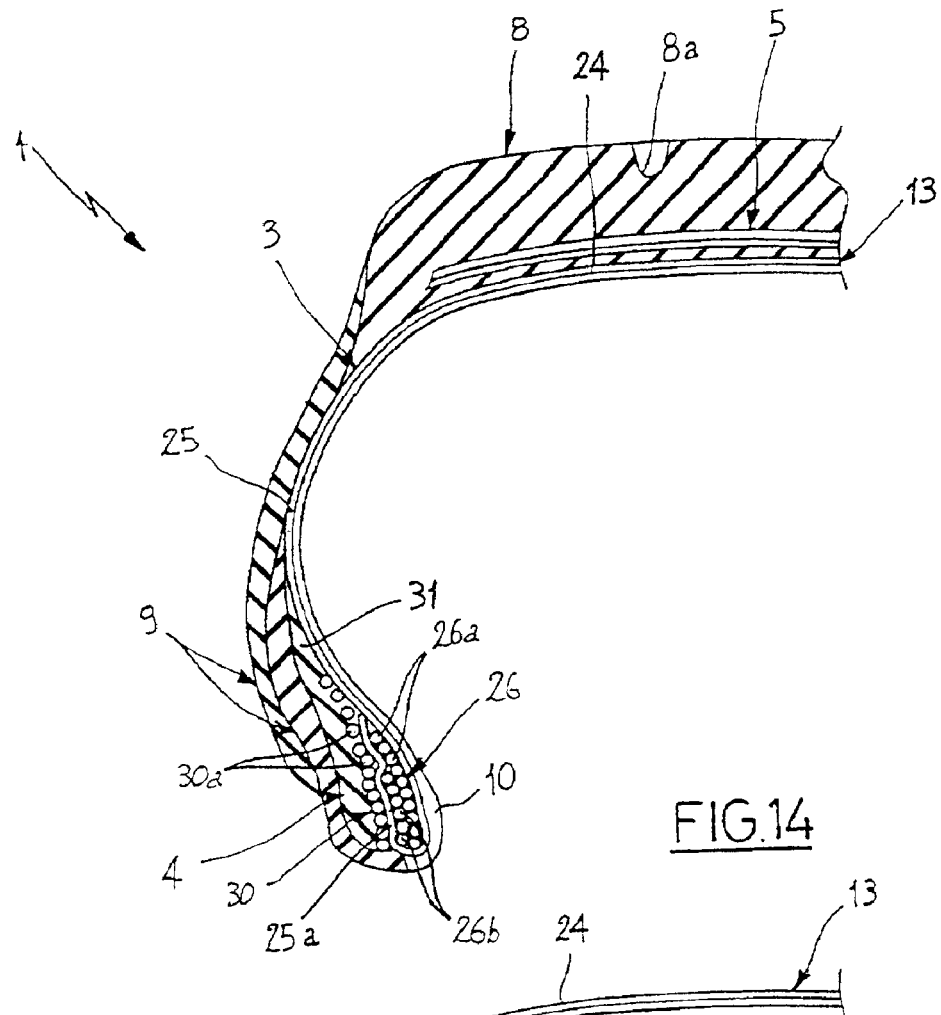
FIG. 14 is a fragmentary cross-section view showing a tyre having a carcass structure obtained in accordance with the invention.
Figure 13:
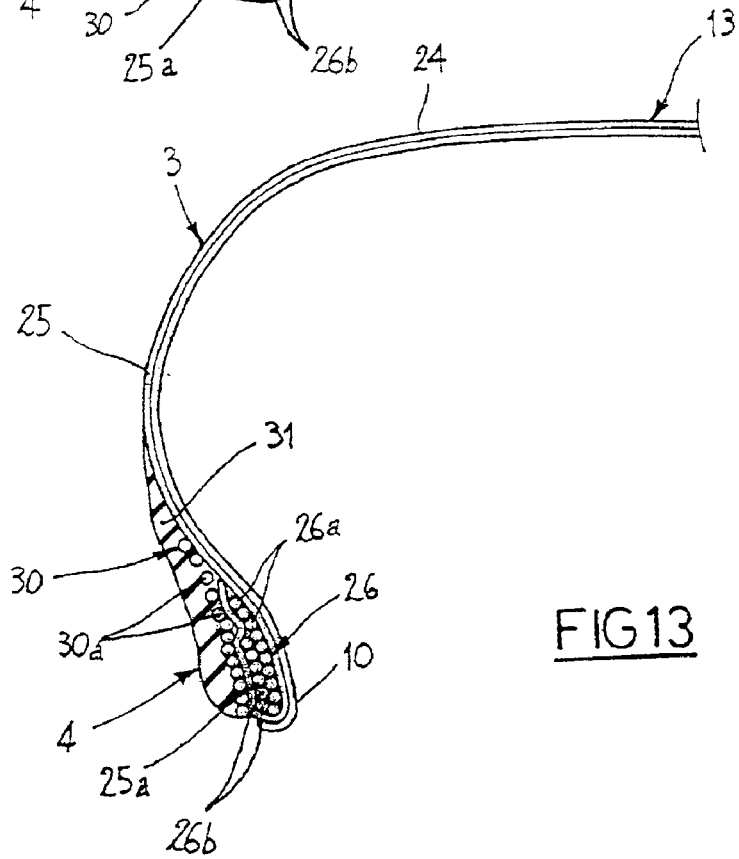
FIG. 13 is a fragmentary diametrical section view of the carcass provided with the second inextensible annular insert and the filling insert referred to in FIG. 12.
Figure 16:
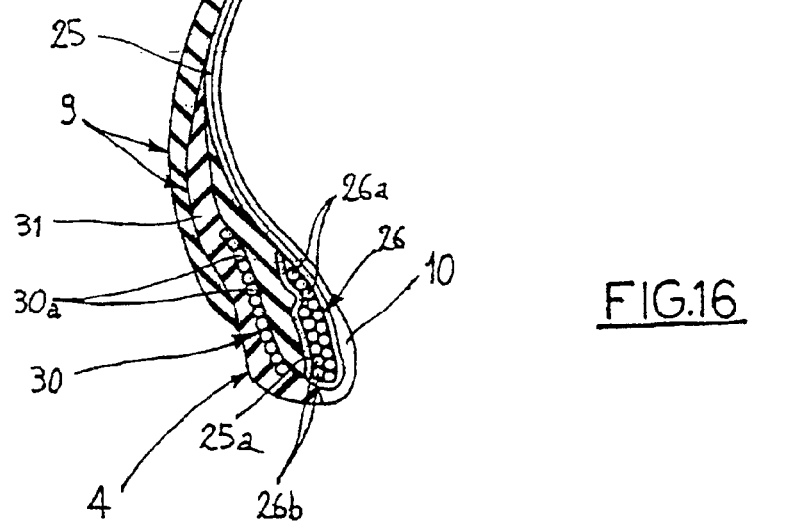
FIG. 16 is a fragmentary cross-section view showing a further alternative embodiment of a tyre to be obtained in accordance with the invention.

It may be conveniently provided that, when the turning-back step is over, the end portion of the end flap 25a should be located at a radially outer position relative to the outer circumferential edge of the first annular insert 26, in such a manner that said insert 26 is completely covered, as shown in the solutions in FIGS. 13, 14 and 16.

Figure 15:
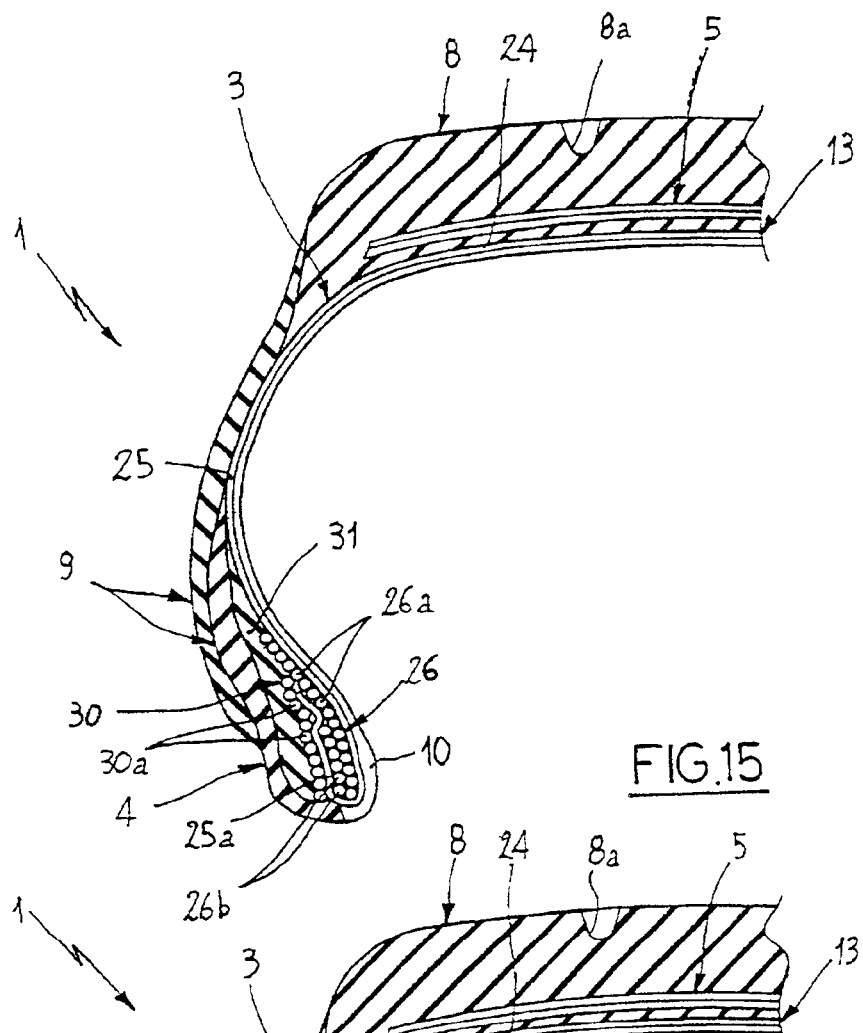
FIG. 15 is a fragmentary cross-section view showing an alternative embodiment of the tyre seen in FIG. 14.

Alternatively, the first insert 26 may be provided to project beyond the end portion of the end flap 25a, as illustrated in the solution shown in FIG. 15.

For accomplishment of each annular reinforcing structure 4 it is also provided that at least one second circumferentially-inextensible annular insert 30 should be applied at an axially outer position relative to the first annular insert 26, as well as, preferably, one filling body 31 of elastomer material put into contact with one of the annular inserts.

Like the first insert 26, the second annular insert 30 is in the form of a crown disposed coaxially with tyre 1, and it is made up of at least one elongated element extending in concentric coils 30a. For manufacture of the second insert 30, any of the modalities described with reference to the first annular insert 26 may be conveniently selected.

As shown in FIGS. 14 and 16, the radial extension of the second annular insert 30 can be conveniently selected in such a manner that it projects beyond the end portions of the respective end flap 25a. Still with reference to FIGS. 14 and 16, the second annular insert 30 may be also provided to radially project relative to the outer circumferential edge of the first annular insert 26.

Alternatively, the second annular insert 30 can have a reduced radial extension, in such a manner that it is the first annular insert 26 that projects beyond the outer circumferential edge of the second insert. This solution is preferably adopted when the first annular insert 26 has such a radial extension that it projects beyond the end portion of the end flap 25a of the carcass ply 3, as shown in FIG. 15.

Application of the filling body 31 can be advantageously performed by first making the filling body itself in a second forming die 32, which can be subsequently moved close to the carcass structure 2 during its manufacturing step for causing application of the filling body itself.

In more detail, it may be also advantageously provided that the second forming die should define, together with a counter-mould not shown, a shaped cavity adapted to be filled with raw elastomer material introduced by injection so as to form the filling body 31.

Alternatively, the filling body 31 can be formed by winding up at least one strip-like element continuously extruded from an adjoining extruder, on a forming die 32 which for the purpose can be driven in rotation, so as to form a plurality of superposed coils in an axial and/or radial direction, in order to define the filling body in the desired conformation.

Formation of the filling body 31 can also be executed directly against the carcass structure 2 during its manufacture, by winding up said extruded strip-like element for example, while the toroidal support 11 is rotated around its own axis.

Advantageously, the second annular insert 30 can be coupled with the filling body 31 in the second forminf die 32, so as to subsequently carry out the simultaneous application of the filling body and the second insert against the carcass structure 2.

In particular, in the embodiment shown in FIGS. 12 to 14, the second annular insert 30 is made against the filling body 31 previously formed on the second forming die 32. The second forming die 32 is then moved axially close to the carcass structure 2 being manufactured, causing the simultaneous application of the second annular insert 30 and the filling body 31 on the carcass structure.

As shown in FIG. 13, when application has been completed, the second insert 30 is interposed between the filling body 31 and the end flap 25a, being in contact with said flap from the opposite side relative to the first annular insert 26. In other words, the end flap 25a is advantageously enclosed and steadily anchored between the first and second annular inserts 26, 30, thereby ensuring an excellent anchoring of the carcass ply 3 within the tyre bead.

It is to note that the same result can be achieved when the second insert 30 and/or the filling body 31 are manufactured directly against the carcass structure 2 being worked, in accordance with the previous description.

Alternatively, it may be provided that on the second forming die 32 the second annular insert 30 should be made first and subsequently the filling body 31, to carry out afterwards the simultaneous application of said second insert and filling body by axially moving the forming die 32 close to the carcass structure 2.

In this case, when application is over, the filling body 31 is interposed between the end flap 25a of the carcass ply 3 and the second annular insert 30, as shown in FIG. 16.

The second annular insert 30 is in turn directly in contact with an axially outer side surface of the filling body 31, on the opposite side relative to the end flap 25a of the carcass ply 3. In this case too, a similar result can be advantageously achieved by sequentially manufacturing the filling body 31 and/or the second annular insert 30 directly against the carcass structure 2.

It is to note that in each of the preferential embodiments illustrated, the filling body 31 has a circumferentially outer portion directly in contact with a side portion of the carcass ply 3.

However, this circumstance could be inexistent if the first annular insert 26, as well as possibly the second annular insert 30 in the solutions of FIGS. 14 and 15, should have a radial extension greater than the radial extension of the filling body 31.

In tyres of the radial type, a belt structure 5 is usually applied to the carcass structure 2.

This belt structure 5 may be made in any manner convenient for a person skilled in the art and in the embodiment shown it essentially comprises a first and a second belt strips 6a, 6b having cords with a respectively crossed orientation. Superposed on the belt strips is an auxiliary belt strip 7, for instance obtained by winding up at least one continuous cord in coils axially disposed in side by side relationship on the first and second belt strips 5, 6.

Then the tread band 8 and sidewalls 9, which are also obtained in any manner convenient for a person skilled in the art, are applied to the belt structure 5.

Embodiments of a belt structure, sidewalls and a tread band that can be advantageously adopted for accomplishment of the tyre in reference on the toroidal support 11 are described in the European Patent Application No. 97830632.2 in the name of the same Applicant.

Tire 1 thus manufactured lends itself to be now submitted, possibly after removal of same from support 11, to a vulcanization step that can be carried out in any known and conventional manner.

During the vulcanization step the carcass ply 3, and belt strips 6a, 6b, 7 can be submitted to a stretching step to achieve a pre-tensioning thereof, giving rise to an expansion of same of a linear amount, measured on the circumferential extension at the equatorial plane X—X of the tyre itself, included by way of example between 2% and 5%.

The present invention achieves important advantages.

In fact, the expedients proposed in the present invention ensure a satisfactory structural strength at the tyre beads.

In particular, interposition of the turned-back end flap 25a between the annular inserts 26, 30 ensures an excellent anchoring of the carcass ply in each tyre bead.

Also advantageous for achieving a structural strength close to the tyre beads is the mutual superposition between the side portions 25 of the strip-like sections 13 which has its maximum value exactly at the radially innermost regions of the carcass structure that are most affected by the effects of stresses under use conditions.

It is also to note that, due to the mutual convergence between the side portions of contiguous strip-like sections, the thread-like elements 14 of the individual sections at the regions 13a of mutual superposition are mutually crossed at an angle corresponding to the above mentioned angle "δ", which represents a further advantage in terms of overall structural strength.

In addition to the above, the presence of the circumferentially-inextensible annular inserts 27, 28 intimately joined to the carcass ply 3, creates a further "bond" between the mutually-crossed thread-like elements 14 belonging to the different strip-like sections. It is in fact to note that orientation of the elongated element or elements defining coils 26a, 26b, 30a of the first and/or second annular inserts extend substantially perpendicularly to the thread-like elements 14 belonging to the individual sections 13.

When vulcanization has been completed, these components, i.e. the thread-like elements 14 of the carcass ply 3 and the elongated elements of the inextensible insert or inserts 26, 30, form a very strong structure in the respective tyre bead, which structure is adapted to efficiently resist also stresses caused by slip thrusts transmitted when the tyre is run on a bend, which thrusts are particularly high in the case of a deflated tyre.

In this way the tyre having a carcass structure made in accordance with the present invention can bear the so-called "J-curve Test" with better results than those currently considered as acceptable in the known art.

It is also to note that the annular inserts 26 and 30, in the form of a crown, offer a further structural protection of the tyre at the beads.

All the above described advantageous aspects are achieved without necessarily involving stiffening of the carcass structure at the sidewall and tread band regions of the tyre.

This circumstance appears to be particularly advantageous for making tyres in which qualities of ride comfort and low rolling resistance are to be placed before the others.

It is also to note that accomplishment of the annular reinforcing structures in accordance with the invention is perfectly consistent with the solution of making the carcass structure directly during the tyre manufacture.

In this connection it is to point out that formation of the carcass ply or plies by deposition of strip-like sections each formed of several cords incorporated into a layer of elastomer material enables important advantages to be achieved. For example, as compared with the method described in the above mentioned U.S. Pat. No. 5,362,343, time for making each carcass ply can be greatly reduced, due to the simultaneous deposition of as many thread-like elements as they are contained in each strip-like section 13 or in the continuous strip-like element 3a from which sections 13 are made. In addition, use of the strip-like elements 13 enables to be dispensed with the operation of previously laying down liner 10 on the toroidal support 11, since the elastomeric layer 17 is capable of adhering in an autonomous manner to the toroidal support 11 for a steady positioning of the individual sections 13.

Precision in positioning the strip-like sections 13 is further improved by the fact that each strip-like section has a great structural consistence, which makes it unaffected by vibrations or similar oscillation effects that can be transmitted from the deposition apparatus 19. In this connection it is to note that deposition of individual cords as described in U.S. Pat. No. 5,362,343 can create some problems exactly due to the vibrations and/or oscillations undergone by the cords during the deposition step.

In addition, the simultaneous deposition of a plurality of thread-like elements in accordance with the invention enables the deposition apparatus 19 to be operated at slower rates than required when the deposition of individual cords is concerned, which is a further advantage in terms of working precision without impairing productivity.

What is claimed is:

1. A tyre for a vehicle wheel, comprising:
    a carcass structure;
    a belt structure disposed circumferentially around the carcass structure;
    a tread band disposed circumferentially around the belt structure; and
    sidewalls provided on opposite side portions of the carcass structure;
    wherein the carcass structure comprises:
        at least one carcass ply comprising thread elements substantially disposed transversely with respect to a circumferential extension of the carcass structure; and
        at least one pair of annular reinforcing structures disposed close to respective inner circumferential edges of the at least one carcass ply;
    wherein each of the annular reinforcing structures comprises:
        a first circumferentially inextensible annular insert, substantially in a form of a crown, disposed substantially coaxially with respect to the carcass structure close to one of the respective inner circumferential edges of the at least one carcass ply; and
        at least one second circumferentially inextensible annular insert, substantially in a form of a crown, disposed substantially coaxially with respect to the carcass structure;
    wherein the first annular insert is formed of at least one first elongated element extending in substantially-radially-aligned concentric coils,
    wherein the at least one second annular insert is disposed at an axially external position with respect to the first annular insert,
    wherein the at least one second annular insert is formed of at least one second elongated element extending in substantially-radially-aligned concentric coils,
    wherein the at least one carcass ply comprises a main part and end flaps,
    wherein the main part extends between inner circumferential edges of the first annular inserts,
    wherein the end flaps extend from the inner circumferential edges of the first annular inserts, away from the main part of the at least one carcass ply,
    wherein the at least one carcass ply is turned back against and around a circumferentially inner coil of respective first annular inserts at transition regions between the main part of the at least one carcass ply and respective end flaps,
    wherein each end flap is axially interposed between respective first and second annular inserts,
    wherein each coil of each first annular insert contacts the at least one carcass ply, and
    wherein the at least one carcass ply contacts each first annular insert over a whole surface extension of the first annular insert.

2. The tyre of claim 1, further comprising at least one filling body of elastomer material in contact with at least one of the annular inserts.

3. The tyre of claim 2, wherein the at least one second annular insert is interposed between the respective end flap and the at least one filling body, and
    wherein the at least one second annular insert is in contact with the respective end flap on an opposite side with respect to the first annular insert.

4. The tyre of claim 1, wherein the respective end flap of the at least one carcass ply completely covers the respective first annular insert.

5. The tyre of claim 1, wherein the at least one second annular insert projects beyond one end region of the respective end flap.

6. The tyre of claim 1, wherein each second annular insert projects beyond an outer circumferential edge of the respective first annular insert.

7. The tyre of claim 1, wherein the first annular insert comprises:
    at least one first series of concentric coaxial coils; and
    at least one second series of concentric coaxial coils;
    wherein the coils of the at least one second series are disposed in axial side-by-side relationship with the coils of the at least one first series.

8. The tyre of claim 7, wherein a number of coils of the at least one first series is greater than a number of coils of the at least one second series.

9. The tyre of claim 8, wherein the at least one first series of coils is directly in contact with the at least one carcass ply, and
    wherein the at least one second series of coils is directly in contact with the respective end flap.

10. The tyre of claim 1, wherein the first annular insert projects beyond an outer circumferential edge of the respective at least one second annular insert.

11. The tyre of claim 2, wherein the at least one filling body is interposed between the respective end flap of the at least one carcass ply and the respective at least one second annular insert.

12. The tyre of claim 11, wherein the at least one second annular insert is directly in contact with at least one axially outer side surface of a respective filling body, and
    wherein the at least one second annular insert is disposed on an opposite side of the respective filling body relative to the respective end flap of the at least one carcass ply.

13. The tyre of claim 2, wherein the at least one filling body comprises a circumferentially outer portion directly in contact with a side surface of the at least one carcass ply.

14. The tyre of claim 1, wherein the at least one carcass ply further comprises:
    a plurality of strip sections each comprising at least two of the thread elements disposed longitudinally and parallel to each other and at least partly covered with at least one layer of raw elastomer material;
    wherein each of the strip sections extends in a substantially U-shaped configuration according to a cross-section outline of the carcass structure to define two side portions and a crown portion,
    wherein the side portions substantially extend in planes orthogonal to a geometric axis of the carcass structure at mutually-spaced-apart positions in an axial direction,
    wherein the crown portions extend at a radially outer position between the side portions,
    wherein the crown portions are disposed in side-by-side relationship with each other along the circumferential extension of the carcass structure, and wherein the side portions of each strip section partly cover or are partly covered by a side portion of at least one adjoining strip section.

15. The tyre of claim 14, wherein the side portions of the strip sections mutually converge towards the geometric axis of the carcass structure, and wherein covering of the side portions of the strip sections progressively increases in a direction of the inner circumferential edge of the at least one carcass ply, starting from a zero value close to transition regions between the side portions and the crown portions.

16. A method of manufacturing a tyre for a vehicle wheel, comprising:

making a carcass structure;

disposing a belt structure circumferentially around the carcass structure;

disposing a tread band circumferentially around the belt structure; and providing sidewalls on opposite side portions of the carcass structure;

wherein making the carcass structure comprises:

making at least one carcass ply comprising thread elements substantially disposed transversely with respect to a circumferential extension of the carcass structure;

forming two or more annular reinforcing structures; and applying at least one of the annular reinforcing structures close to respective inner circumferential edges of the at least one carcass ply;

wherein forming each annular reinforcing structure comprises:

applying a first circumferentially inextensible annular insert, substantially in a form of a crown, disposed substantially coaxially with respect to the carcass structure close to a respective inner circumferential edge of the at least one carcass ply;

turning back a respective end flap of the at least one carcass ply against and around a circumferentially inner coil of a respective first annular insert at a transition region between a main part of the at least one carcass ply and the respective end flap; and applying at least one second circumferentially inextensible annular insert, substantially in a form of a crown, disposed substantially coaxially with respect to the carcass structure close to the first annular insert;

wherein the first annular insert is formed of at least one first elongated element extending in substantially-radially-aligned concentric coils, wherein the at least one second annular insert is disposed at an axially external position with respect to the first annular insert, wherein the at least one second annular insert is formed of at least one second elongated element extending in substantially-radially-aligned concentric coils, wherein the main part of the at least one carcass ply extends between inner circumferential edges of the first annular inserts, wherein, prior to turning back the end flaps of the at least one carcass ply, the end flaps extend from the inner circumferential edges of the first annular inserts, away from the main part, wherein each end flap is axially interposed between respective first and second annular inserts, wherein each coil of each first annular insert contacts the at least one carcass ply, and wherein the at least one carcass ply contacts each first annular insert over a whole surface extension of the first annular insert.

17. The method of claim 16, further comprising applying at least one filling body of elastomer material in contact with at least one of the annular inserts.

18. The method of claim 16, wherein at least one of the first and second annular inserts is formed by winding up a continuous elongated element in radially superposed concentric coils.

19. The method of claim 16, wherein at least one of the first and second annular inserts is formed directly against the at least one carcass ply.

20. The method of claim 16, wherein at least one of the first and second annular inserts is formed in a forming die, and wherein the forming die is subsequently moved against the at least one carcass ply for applying the at least one annular insert.

21. The method of claim 16, wherein turning back the respective end flap comprises:

axially pushing the end flap from a first position to a second position; and exerting a rolling action on the end flap for laterally applying the end flap against the first annular insert;

wherein, in the first position, the end flap projects radially inward with respect to the first annular insert, and wherein, in the second position, the end flap is axially oriented away from an equatorial plane of the carcass structure.

22. The method of claim 17, wherein applying the at least one filling body comprises:

making the at least one filling body in a forming die; and axially moving the forming die against the carcass structure.

23. The method of claim 22, further comprising coupling the at least one filling body with the at least one second annular insert in the forming die before simultaneously applying the at least one filling body and the at least one second annular insert against the carcass structure.

24. The method of claim 17, wherein applying the at least one filling body comprises forming the at least one filling body directly against the carcass structure.

25. The method of claim 24, wherein forming the at least one filling body directly against the carcass structure comprises extruding at least one continuous strip element wound up in superposed coils.

26. The method of claim 16, wherein making the at least one carcass ply comprises:

preparing strip sections, each comprising longitudinal and parallel thread elements at least partly coated with at least one layer of raw elastomer material; and depositing each of the strip sections onto a toroidal support in a substantially U-shaped conformation around a cross-section outline of the toroidal support to define two side portions and a crown portion;

wherein the side portions substantially extend in planes orthogonal to a geometric axis of the toroidal support at mutually-spaced-apart positions in an axial direction, wherein the crown portions extend at a radially outer position between the side portions, wherein the crown portions are disposed in side-by-side relationship with each other along a circumferential extension of the toroidal support, and wherein the side portions of each strip section partly cover or are partly covered by a side portion of at least one adjoining strip section.

27. The method of claim 26, wherein the side portions of the strip sections mutually converge toward the geometric axis of the toroidal support, and wherein covering of the side portions of the strip sections progressively increases in a direction of the inner circumferential edge of the at least one carcass ply, starting from a zero value close to transition regions between the side portions and the crown portions.

28. The method of claim 26, wherein the strip sections are deposited so that the side portions of each strip section project from an inner circumferential edge of the toroidal support, and wherein projecting ends of the side portions define the end flaps of the at least one carcass ply.

* * * * *